(12) United States Patent
Stahl et al.

(10) Patent No.: US 9,919,686 B2
(45) Date of Patent: Mar. 20, 2018

(54) DISC BRAKE FOR A MOTOR VEHICLE, HAVING A SEALING ARRANGEMENT DESIGNED FOR AN ELECTRONIC PARKING BRAKE

(71) Applicant: Lucas Automotive GmbH, Koblenz (DE)

(72) Inventors: Peter Stahl, Bad Neuenahr-Ahrweiler (DE); Boris Kuhnert, Lahnstein (DE); Christian Damrau, Dahlheim (DE); Christian Tharr, Boppard (DE); Dietrich Podzuweit, Dieblich (DE); Maria Heinemann, Bad Bodendorf (DE); Martin Brandt, Waldesch (DE); Nong Dang, Koblenz (DE); Michael Schog, Mertloch (DE)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 14/907,895

(22) PCT Filed: Jul. 22, 2014

(86) PCT No.: PCT/EP2014/065698
§ 371 (c)(1),
(2) Date: Jan. 27, 2016

(87) PCT Pub. No.: WO2015/014664
PCT Pub. Date: Feb. 5, 2015

(65) Prior Publication Data
US 2016/0167627 A1 Jun. 16, 2016

(30) Foreign Application Priority Data
Aug. 1, 2013 (DE) .................. 10 2013 012 823

(51) Int. Cl.
*B60T 1/06* (2006.01)
*F16D 65/18* (2006.01)
(Continued)

(52) U.S. Cl.
CPC .............. *B60T 1/065* (2013.01); *F16D 65/18* (2013.01); *F16J 15/164* (2013.01); *F16J 15/56* (2013.01);
(Continued)

(58) Field of Classification Search
CPC .. F16D 65/18; F16D 2121/02; F16D 2127/02; F16J 15/56; F16J 15/32
(Continued)

(56) References Cited

U.S. PATENT DOCUMENTS

| 4,156,532 A | 5/1979 | Kawaguchi et al. |
| 4,229,013 A | 10/1980 | Burke et al. |

(Continued)

FOREIGN PATENT DOCUMENTS

| DE | 1655485 C3 | 6/1975 |
| DE | 3024299 A1 | 1/1981 |

(Continued)

OTHER PUBLICATIONS

German Search Report, Application No. 102013012823.4 dated Mar. 12, 2014.
(Continued)

*Primary Examiner* — Melanie Torres Williams
(74) *Attorney, Agent, or Firm* — MacMillan, Sobanski & Todd, LLC

(57) ABSTRACT

A disc brake for a motor vehicle, wherein it is possible to displace the actuating piston in the housing both by hydraulic pressure activation of a hydraulic chamber formed in the housing and via a mechanical actuator, wherein the sealing ring is accommodated in an annular groove formed in the (Continued)

housing. Provision is made here for the annular groove to have a groove floor, which runs substantially parallel to the longitudinal axis of the piston, and two groove walls, which adjoin the groove floor, wherein—as seen in the direction of the longitudinal axis of the piston—a first groove wall is directed away from the hydraulic chamber and a second groove wall is directed towards the hydraulic chamber, wherein the first groove wall merges into the groove floor via a rounded or bevelled transition region at a varying distance from the longitudinal axis of the piston.

14 Claims, 2 Drawing Sheets

(51) Int. Cl.
*F16J 15/16* (2006.01)
*F16J 15/56* (2006.01)
*F16D 121/02* (2012.01)
*F16D 123/00* (2012.01)
*F16D 127/02* (2012.01)
*F16D 125/08* (2012.01)
*F16D 121/18* (2012.01)

(52) U.S. Cl.
CPC ...... *F16D 2121/02* (2013.01); *F16D 2121/18* (2013.01); *F16D 2123/00* (2013.01); *F16D 2125/08* (2013.01); *F16D 2127/02* (2013.01)

(58) Field of Classification Search
USPC .......................................... 188/72.4; 277/377
See application file for complete search history.

(56) References Cited

U.S. PATENT DOCUMENTS

| | | | | |
|---|---|---|---|---|
| 4,342,463 A * | 8/1982 | Burke | ...................... | F16D 65/18 277/500 |
| 4,352,498 A * | 10/1982 | Burke | ...................... | F16D 65/18 188/72.3 |
| 5,325,940 A * | 7/1994 | Rueckert | ................. | F16D 65/18 188/71.8 |
| 5,826,681 A * | 10/1998 | Kubo | ...................... | F16D 65/18 188/71.8 |
| 6,044,936 A * | 4/2000 | Matsumoto | ............. | F16D 65/18 188/72.4 |
| 6,164,422 A * | 12/2000 | Sanitate | ................... | F16D 65/14 188/72.4 |
| 6,244,393 B1 * | 6/2001 | Weidenweber | ......... | F16D 65/18 188/196 P |
| 7,744,166 B2 * | 6/2010 | Leiter | ..................... | B60T 7/107 188/106 P |
| 8,408,366 B2 * | 4/2013 | Kono | ...................... | F16D 65/18 188/370 |
| 8,448,754 B2 * | 5/2013 | Kubic | .................... | F16J 15/164 188/370 |
| 8,631,912 B2 | 1/2014 | Langer et al. | | |
| 8,881,874 B2 * | 11/2014 | Kong | ...................... | F16D 65/18 188/71.8 |
| 9,156,459 B2 | 10/2015 | Knechtges et al. | | |
| 2009/0127036 A1 * | 5/2009 | Langer | .................... | F16D 65/18 188/218 XL |
| 2011/0308898 A1 * | 12/2011 | Shiraki | ................. | B60T 13/741 188/72.4 |

FOREIGN PATENT DOCUMENTS

| | | | |
|---|---|---|---|
| DE | 10215935 A1 | 10/2003 | |
| JP | H11280805 A | 10/1999 | |
| JP | 2012001053 A * | 1/2012 | ........... B60T 8/4872 |
| WO | 2007/125086 A1 | 11/2007 | |
| WO | 2012016612 A1 | 2/2012 | |

OTHER PUBLICATIONS

PCT International Search Report and the Written Opinion, Application No. PCT/EP2014/065698 filed Jul. 22, 2014, dated Oct. 9, 2014.
PCT International Preliminary Report on Patentability, Application No. PCT/EP2014/065698 filed Jul. 22, 2014, dated Jul. 9, 2015.

\* cited by examiner ced brake pads
can be effectively suppressed in this way. The reset movement of the elastically deformed sealing ring is supported in particular also by the hydraulic pressure present on the side of the sealing ring directed towards the hydraulic chamber. This hydraulic pressure has considerable influence on the elastic deformation behaviour of the sealing ring in service braking and on its relaxation and deformation recovery when the hydraulic pressure is released.

DISC BRAKE FOR A MOTOR VEHICLE, HAVING A SEALING ARRANGEMENT DESIGNED FOR AN ELECTRONIC PARKING BRAKE

CROSS-REFERENCE TO RELATED APPLICATIONS

This application is a national stage of International Application No. PCT/EP2014/065698 filed Jul. 22, 2014, the disclosures of which are incorporated herein by reference in entirety, and which claimed priority to German Patent Application No. 10 2013 012 823.4 filed Aug. 1, 2013, the disclosures of which are incorporated herein by reference in entirety.

BACKGROUND OF THE INVENTION

The present invention relates to a disc brake for an automotive vehicle, wherein the disc brake comprises a housing, a brake disc rotatable relative to the housing, at least one friction pad, and at least one actuation device, which is formed to effect a relative movement between the brake disc and the friction pad, such that the friction pad can be brought into contact with the brake disc, wherein the actuation device has at least one actuating piston movable along a piston longitudinal axis, which actuating piston is guided in a hydraulically sealing manner within the housing by means of a sealing arrangement having a sealing ring, wherein the actuating piston is movable within the housing both by means of applying hydraulic pressure of a hydraulic chamber formed in the housing and by means of a mechanical actuator, wherein the sealing ring is taken up in an annular groove formed in the housing.

Disc brakes of this kind are known from the prior art.

In the case of such disc brakes, the actuating piston can be moved both hydraulically as part of normal service braking and mechanically by means of an actuator arrangement to activate a parking brake function. In both instances of movement, the piston must be guided in a sealing manner within the housing to prevent an escape of hydraulic fluid from the hydraulic chamber. To do this, a sealing ring is normally provided in an annular groove formed in the housing, which ring guides the movably guided piston in a sealing manner. In this context it was recognised that conventional sealing arrangements, in which a sealing ring is simply inserted into a corresponding annular groove, can lead to significant difficulties in the interaction between instances of service braking and activations of the parking brake function carried out in the interim. This is due to the fact that disregarding measures to compensate for wear on the brake pads the piston stroke of the actuating piston that takes place during normal service braking only comprises relatively short distances, wherein in such service braking the sealing ring adheres to the external circumferential surface of the piston on account of the adhesive friction on this. In other words, during normal service braking the piston does not slip through the sealing ring. Instead, the sealing ring is deformed only elastically on account of the piston movement caused hydraulically. If the hydraulic pressure in the hydraulic chamber is released on termination of the braking, the actuating piston returns to its original state due to the substantially purely elastic deformation of the sealing ring during braking and the elastic relaxation following this, as described in the documents DE 30 24 299 A1, U.S. Pat. No. 4,156,532 and JP H11-280 805 A, for example. Residual abrading torques following service braking between the brake disc and the pressed-on brake pads can be effectively suppressed in this way. The reset movement of the elastically deformed sealing ring is supported in particular also by the hydraulic pressure present on the side of the sealing ring directed towards the hydraulic chamber. This hydraulic pressure has considerable influence on the elastic deformation behaviour of the sealing ring in service braking and on its relaxation and deformation recovery when the hydraulic pressure is released.

If the parking brake is now activated by means of the mechanical actuator, however, a movement of the actuating piston takes place, so to speak, but not due to application of the hydraulic pressure in the pressure chamber, but rather due to actuation of the mechanical actuator. In an activation of the parking brake in this way, the hydraulic deformation support falls away due to the lack of hydraulic pressure present in the hydraulic chamber, therefore, so that the deformation behaviour of the sealing ring also changes. Hydraulic pressure no longer acts upon the sealing ring on the hydraulic chamber side and it is accordingly not sufficiently strongly deformed and pressed against the external circumferential surface of the actuating piston to maintain the adhesive friction, as is the case in normal service braking. The risk accordingly arises when activating the parking brake via the actuator that when the actuating piston moves, it overcomes the adhesive friction between actuating piston and sealing ring and ultimately slips through the sealing ring by a certain distance. If the parking brake is later released again, the sealing ring no longer provides the elastic reset movement that is usually effective during service braking due to this slipping through. This means that the actuating piston largely remains in its position that it assumed during the activated state of the parking brake. As a consequence, residual abrading torques that are considerable in some cases and are accompanied by disadvantages such as pad wear, increased fuel consumption, noise emission etc. occur following the actual release of the parking brake.

To tackle this problem, the prior art according to WO 2007/12086 A1 proposes to provide the annular groove with a groove floor running obliquely, in which the depth of the groove increases continuously transversely to the piston longitudinal axis in the return stroke direction. A force component is thus to be attained in the reset direction that acts in a similar manner to a downhill-slope force and moves the sealing ring away from the flank of the groove on the closing side.

The document WO 2012/016612 A1 also tackles the problem described above arising from the interplay between service braking and activation of the parking brake. In this solution, however, the occurrence of residual abrading torques following the activation of the parking brake is counteracted not by configuration of the annular groove, but rather by targeted use of a slip control system.

Further prior art is known from the document DE 16 55 485 A.

BRIEF SUMMARY OF THE INVENTION

A feature of the present invention is to provide a disc brake of the type described at the beginning in which a clearance can be obtained by simple and cost-effective means even upon activation of the parking brake via the actuator and subsequent release of the same.

This feature is achieved wherein it is provided in particular that the annular groove has a groove floor running substantially parallel to the piston longitudinal axis as well as two groove walls bordering the groove floor, wherein viewed in the direction of the piston longitudinal axis a first groove wall is directed away from the hydraulic chamber and a second groove wall is directed towards the hydraulic chamber, wherein the first groove wall merges via a rounded or bevelled transition area with a varying distance to the piston longitudinal axis into the groove floor.

Due to the configuration according to the invention of the annular groove with a groove floor running substantially parallel to the piston longitudinal axis, normal behaviour of the seal between housing and actuating piston is achieved with respect to conventional brakes. Unlike the prior art cited here, no undesirable increases in friction occur on account of the inclined groove floor. It is true that the rounded or bevelled transition area described is provided between the first groove wall and the groove floor. In the event of movement of the actuating piston by means of the mechanical actuator, this causes the sealing ring to be drawn into the transition area and thereby pressed, so to speak, onto the external circumferential surface of the actuating piston, due to which the adhesive friction between sealing ring and external circumferential surface of the actuating piston is increased and a slipping of the actuating piston through the sealing ring can be effectively reduced. Furthermore, even if the actuating piston slips through the sealing ring in consequence of activation of the parking brake function, a fast recovery of the original sealing ring position on the actuating piston can be ensured to achieve the desired elastic reset movement during subsequent service braking. In the invention the groove floor is formed over its axial progression substantially parallel to the piston longitudinal axis and not bevelled as in the prior art, due to which the behaviour of the sealing ring during normal service braking under hydraulic pressure remains substantially unchanged relative to conventional braking systems. In normal service braking, therefore, unusually strong pressing of the sealing ring onto the external circumferential surface of the actuating piston does not occur, such as can be the case in the prior art with the bevelled groove floor.

A development of the invention provides that the transition area has a profile that is substantially in the shape of a circular arc when viewed in a section containing the axis. It can be provided according to the invention that the radius of the profile in the shape of a circular arc is in the range between 0.5 and 2 mm. Due to the selection of a profile in the shape of a circular arc, in particular with the radii indicated above, edge-free harmonious transitions are achieved, which have no negative effects on the life of the sealing ring.

Furthermore, it can be provided according to the invention that the transition area is formed as a transition surface running obliquely, which extends at an angle of between 35 and 55° relative to the groove floor. The positive effects explained at the beginning can be achieved effectively even with an arrangement of this kind.

A development of the invention provides that the first groove wall or/and the second groove wall runs radially within the transition area substantially perpendicular to the piston longitudinal axis. It can be provided that the second groove wall runs out in its radially inner area in a surface section that deviates from the perpendicular progression to the piston longitudinal axis. In particular, the present invention provides in this context that the surface section is formed by a bevel, which encloses an angle of between 15° and 45° with the second groove wall. A volume area is created by this in the annular groove that a hydraulic fluid can enter from the hydraulic chamber and in which an adequate fluid cushion can build up for the hydraulic deformation support. This is made easier in particular by the fact that the surface section extends over an area of 30% to 70% of the radial height of the annular groove.

Furthermore, it can be provided according to the invention that a transition surface is provided between the groove floor and the second groove wall. In this context it is possible that the transition surface is formed as a bevel, which runs at an angle of 30° to 50° relative to the groove floor. This measure also supports a desired behaviour of the sealing element within the annular groove, as due to this transition surface the sealing element can be kept at a certain distance from the second groove wall, so that on the side of the sealing ring directed towards the second groove wall an adequate fluid cushion can form for building up deformation-supporting hydraulic pressure.

It can basically be provided according to the invention that the sealing ring is formed with a larger outer diameter than the inner diameter of the annular groove, wherein the outer diameter of the sealing ring is preferably formed with a radial oversize of 0.5-1.2 mm, preferably of 0.8 mm, relative to the inner diameter of the annular groove. The oversize can vary depending on the configuration and dimensioning of the disc brake.

To be able to guarantee the desired behaviour of the disc brake during service braking processes, but also during an activation of the parking brake, a development of the invention provides that the volume of the cavity enclosed by the annular groove is greater than the volume of the sealing ring, preferably by a factor of 1.1 to 1.5.

As already indicated at the beginning, it can be provided according to the invention that the mechanical actuator is formed as a component of an electrically activatable parking brake. Electrically activatable parking brakes of this kind are used increasingly in modern automotive engineering and give rise to the problem described at the beginning with a conventional configuration of the sealing arrangement.

The invention also relates to a housing, in particular a brake calliper, for a disc brake of the type described above, with a cylindrical piston receptacle opening forming a hydraulic chamber, in which opening an actuating piston that is movable along a piston longitudinal axis can be taken up, which piston is guided movably in the housing in a hydraulically sealing manner by means of a sealing arrangement with a sealing ring, wherein the sealing ring can be fitted in an annular groove formed in the housing, wherein the annular groove has a groove floor running substantially parallel to the piston longitudinal axis as well as two groove walls connecting to the groove floor, wherein viewed in the direction of the piston longitudinal axis a first groove wall is directed away from the hydraulic chamber and a second groove wall is directed towards the hydraulic chamber, wherein the first groove wall merges via a rounded or bevelled transition area at a varying distance from the piston longitudinal axis into the groove floor.

Other advantages of this invention will become apparent to those skilled in the art from the following detailed description of the preferred embodiments, when read in light of the accompanying drawings.

DETAILED DESCRIPTION OF THE INVENTION

Figure 1:
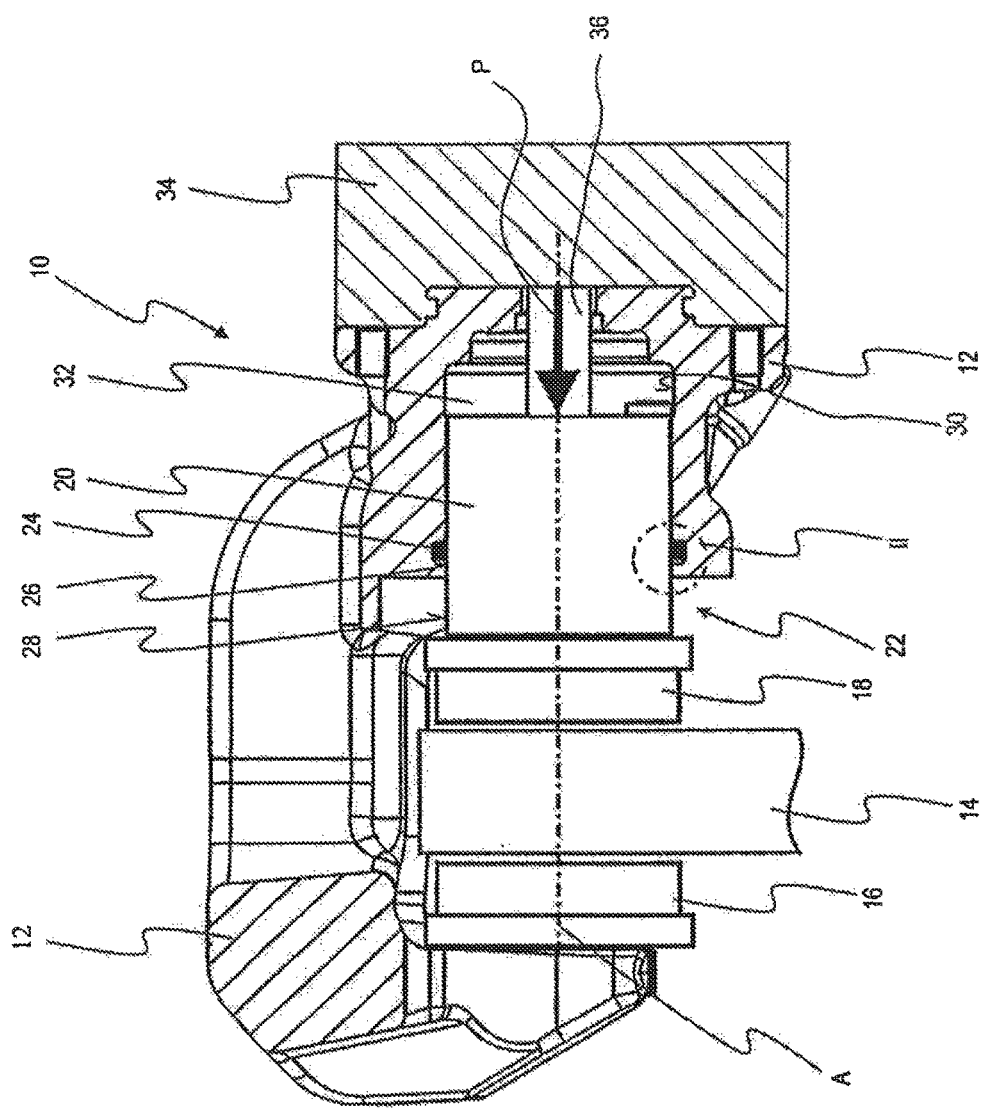
FIG. 1 shows a sectional view through a disc brake according to the present invention containing the axis.

FIG. 1 shows a disc brake according to the invention in a sectional view containing the axis and generally designated 10. This is formed in the form of a brake calliper and comprises a housing 12, which spans a brake disc 14 connected non-rotatably to a vehicle wheel in a known manner. A brake pad 16 as well as another brake pad 18 is supported in the housing 12. The brake pad 18 is movable in the housing 12 by means of an actuating piston 20, which is movable along a piston longitudinal axis A according to the arrow P.

The actuating piston 20 is part of an actuation device 22, which can be actuated optionally hydraulically or electromechanically. For hydraulic actuation it is provided that the actuating piston 20 is guided movably in a piston receptacle opening 30 in a sealing manner by means of a sealing ring 24, which is taken up in an annular groove 26, on its external circumferential surface 28. Together with the actuating piston 20, the piston receptacle opening 30 encloses a hydraulic chamber 32, which can be filled with hydraulic fluid and put under pressure in a known manner. As a consequence of the application of pressure, the actuating piston 20 moves in a desired manner, so that the brake pads 16 and 18 can be applied to the brake disc 14 and brake its rotary movement.

In addition to this hydraulic actuation, mechanical actuation is also provided. To this end, an actuator 36 is moved by means of an electromechanical parking brake unit 34, which is not to be defined in greater detail, and by means of this without the application of hydraulic pressure the actuating piston 20 is moved along the piston longitudinal axis A and so a closing effect onto the brake disc 14 is achieved.

The combination of hydraulic and electromechanical actuation is already known from the prior art.

Figure 2:
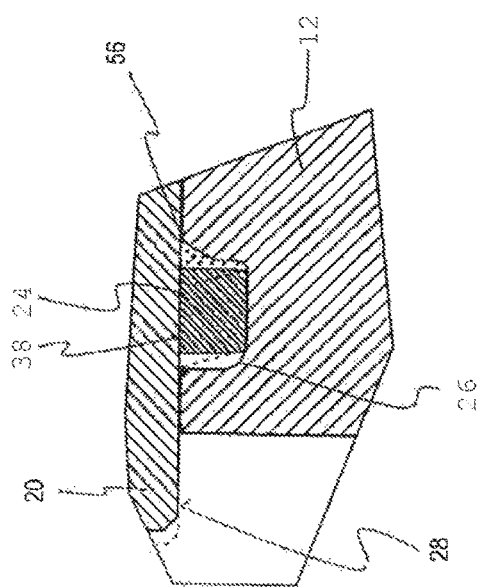
FIG. 2 shows the picture detail marked II in FIG. 1 in an enlarged representation.
Figure 3:
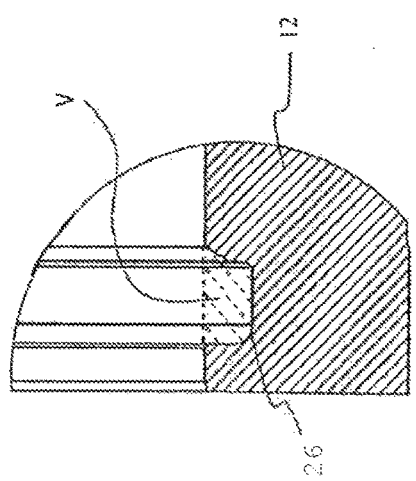
FIG. 3 shows the view according to FIG. 2, wherein the sealing ring and the actuating piston were omitted.

In the following, the configuration according to the invention of the sealing between the external circumferential surface 28 of the actuating piston 20 and the housing 12 is to be examined in detail. Reference is made to the FIGS. 2 to 4 for this. In FIG. 2, the picture detail II from FIG. 1 is recognised, wherein it is recognisable in particular that the sealing ring 24 is taken up in the annular groove 26 of the housing 12, and the sealing ring 24 is in full, sealing frictional contact with its internal circumferential surface 38 with the external circumferential surface 28 of the actuating piston 20. Furthermore, it is recognised that the annular groove 26 encloses a surrounding annular volume V (see hatching in FIG. 3) that is greater than the volume of the sealing ring 24 (see FIG. 2). The sealing ring 24 is thus taken up in the annular groove 26 with axial play. The volume ratio of the volume V enclosed in the annular groove 26 relative to the volume of the sealing ring 24 lies in the range between 1.1 and 1.5.

Figure 4:
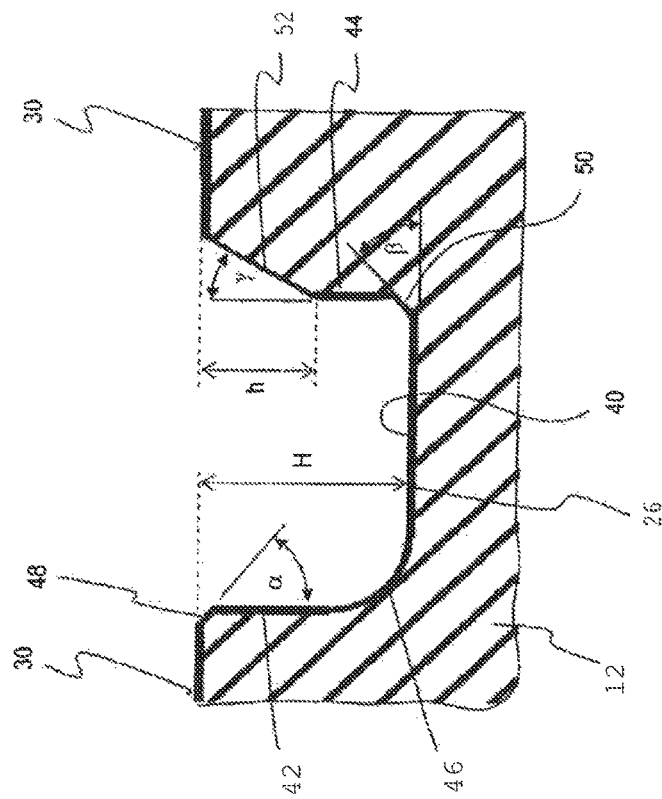
FIG. 4 shows an enlarged view of the profile of the annular groove according to FIG. 3.

FIG. 4 shows in an enlarged representation the profile contour of the annular groove 26 in detail. This has a groove floor 40, which runs substantially parallel to the piston longitudinal axis A and provides a surrounding annular surface in the housing 12. The groove floor 40 is delimited by a first groove wall 42, which is arranged on the side of the annular groove 26 directed away from the hydraulic chamber, and a second groove wall 44 (on the right side in FIG. 4), which is arranged on the side of the annular groove 26 directed towards the hydraulic chamber 32, if the direction of the piston longitudinal axis A is taken as the reference direction.

A transition area 46 is provided between the groove floor 40 and the first groove wall 42, which area is formed rounded substantially in the shape of a circular arc and merges tangentially into the groove wall 42 and the groove floor 40. The groove wall 42 merges via a bevel 48 into the inner circumferential surface 30 defining the piston receptacle opening. The bevel angle $\alpha$ is roughly 45°.

The groove floor 40 merges via a transition surface 50 into the second groove wall 44. The transition surface 50 runs at an angle $\beta$ of 45° relative to the groove floor 40. The second groove wall 44 is bevelled in its radially inner area, wherein the significant angle $\gamma$ is 30° in the example. This yields a surface section 52 via which the second groove wall 44 merges into the internal circumferential surface 30 of the piston receptacle opening. The height h over which the transition surface extends is slightly more than 50% of the height H by which the annular groove 26 extends radially into the housing 12 in the example.

Let it also be noted that the sealing ring 24 is taken up in the annular groove 26 with radial overdimensioning.

The mode of operation is to be enlarged upon below.

Due to the dimensioning of the annular groove 26 and the inserted sealing ring 24, the sealing ring 24 lies with its internal circumferential surface 38 fully and under substantial radial forces flat on the external circumferential surface 28 of the actuating piston 20 in a sealing manner. If the actuating piston 20 is now moved, as a result of an increase in the hydraulic pressure in the hydraulic chamber 32 to activate the service brake, in the direction of the piston longitudinal axis A, then normally—if wear compensation effects of the brake pads are disregarded—only a relatively small piston movement is necessary to achieve a braking effect. This is indicated in FIG. 2 by dashed lines. In a movement of this kind, the sealing ring 24 is deformed elastically to a parallelogram, for instance. This is also indicated by dashed lines in FIG. 2. However, this does not usually happen to the extent that the adhesive friction between sealing element 24 and external circumferential surface 28 of the actuating piston 20 is overcome. This elastic deformation is supported by the hydraulic pressure, which develops in FIG. 2 in the volume area 56 provided with dots on the right side of the sealing ring 24 within the annular groove 26. When the hydraulic pressure is released again, the sealing ring can return elastically to its starting position and in doing so take the actuating piston 20 back to its starting position again, due to which residual abrading torques can be avoided.

If a movement of the actuating piston now takes place in consequence of an activation of the parking brake device 34, however, without the hydraulic pressure in the hydraulic chamber 32 being changed significantly, in particular without this being markedly increased corresponding to a service braking process, then as a result of the movement of the actuating piston 20, the sealing ring 24 is carried along due to the adhesive friction between the internal circumferential surface 38 and the external circumferential surface 28. The sealing ring 24 reaches the rounded transition area 46 in this way and is deformed radially inwards accordingly. The sealing ring is pressed by this in the corresponding surface area onto the external circumferential area 28 of the actuating piston 20, due to which the adhesive friction increases. This makes it difficult for the actuating piston 20 to overcome the adhesive friction forces and slip through the sealing ring. On the contrary, support is provided by the fact that the sealing ring remains adhering more strongly in situ to the external circumferential surface of the actuating piston 20 and the sealing ring can thus retain its reset effect. If the actuating piston 20 should nevertheless slip through the sealing ring 24, thus a relative movement take place that is undesirable in itself, the sealing ring 24 will be deformed in subsequent service braking by the hydraulic effect of the brake fluid in the volume area 56 to such an extent that it quickly recovers its reset effect over the transition area 46 and the deformation resulting from this, so that it is moved on the actuating piston 20 into its desired starting position again and can relax elastically to avoid residual abrading torques and draw the actuating piston back.

Due to the profiling selected, a type of regeneration effect of the sealing system thus occurs, which is used to the effect that, in service braking following an activation of the electric parking brake, a targeted deformation of the sealing ring takes place within the annular groove, due to which the sealing ring 24 can position itself in its desired starting position on the actuating piston 20. The desired reset effect of the sealing ring 24 is guaranteed by this.

The invention thus offers a simple option that can be manufactured cost-effectively for taking account of the problem described at the beginning in an interaction between service braking and an actuation of the electric parking brake, and in the event of an undesirable slippage of the sealing ring on the external circumferential surface of the actuating piston in consequence of actuation of the electric parking brake, for counteracting this by fast repositioning.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A disc brake for an automotive vehicle, wherein the disc brake comprises a housing, a brake disc rotatable relative to the housing, at least one friction pad, and at least one actuation device, which is formed to effect a relative movement between the brake disc and the friction pad such that the friction pad can be brought into contact with the brake disc, wherein the actuation device has at least one actuating piston movable along a piston longitudinal axis, which actuating piston is guided in a hydraulically sealing manner within the housing by means of a sealing arrangement having a sealing ring, wherein the actuating piston is movable within the housing both by means of applying a hydraulic pressure of a hydraulic chamber provided within the housing and by means of a mechanical actuator, wherein the sealing ring is taken up in an annular groove formed in the housing, wherein the annular groove comprises a groove floor extending parallel to the piston longitudinal axis as well as two groove walls adjacent to the groove floor, wherein—as viewed in the direction of the piston longitudinal axis—a first groove wall is directed away from the hydraulic chamber and a second groove wall is directed towards the hydraulic chamber, wherein the first groove wall merges via a rounded transition area with a varying distance to the piston longitudinal axis into the groove floor and the second groove wall merges via a bevelled transition area with a varying distance to the piston longitudinal axis into the groove floor, wherein the transition area has a profile that is substantially in the shape of a circular arc as viewed in a section containing the axis, and wherein the radius of the profile in the shape of the circular arc is in the range between 0.5 and 2 mm.

2. The disc brake according to claim 1, wherein the transition area is formed as an oblique transition surface, which extends at an angle of between 35 and 55° relative to the groove floor.

3. The disc brake according to claim 1, wherein the first groove wall or/and the second groove wall runs radially within the transition area substantially perpendicular to the piston longitudinal axis.

4. The disc brake according to claim 1, wherein the second groove wall runs out in its radially inner area in a surface section, which deviates from the perpendicular progression to piston longitudinal axis.

5. The disc brake according to claim 4, wherein the surface section is formed by a bevel, which encloses an angle of between 15° and 45° with the second groove wall.

6. The disc brake according to claim 4, wherein the surface section extends over an area of 30% to 70% of the radial height of the annular groove.

7. The disc brake according to claim 1, wherein a transition surface is provided between the groove floor and the second groove wall.

8. The disc brake according to claim 7, wherein the transition surface is formed as a bevel, which runs at an angle of 30° to 50° relative to the groove floor.

9. The disc brake according to claim 1, wherein the sealing ring is formed with a larger outer diameter than the inner diameter of the annular groove.

10. The disc brake according to claim 9, wherein a volume of the cavity enclosed by the annular groove is greater than a volume of the sealing ring.

11. The disc brake according to claim 1, wherein the mechanical actuator is formed as a component of an electrically activatable parking brake.

12. The disc brake according to claim 9, wherein the outer diameter of the sealing ring is formed with a radial oversize of 0.5-1.2 mm.

13. The disc brake according to claim 10, wherein the volume of the cavity enclosed by the annular groove is greater than the volume of the sealing ring by a factor of 1.1 to 1.5.

14. A housing for a disc brake comprising:
a cylindrical piston receptacle opening forming a hydraulic chamber, in which opening an actuating piston of an actuation device can be taken up, which piston is movable along a piston longitudinal axis, wherein the actuation device is formed to effect a relative movement between a brake disc and a friction pad, so that the friction pad can be brought into contact with the brake disc, wherein the actuating piston is guided movably within the housing in a hydraulically sealing manner by means of a sealing arrangement with a sealing ring and wherein the actuating piston is movable within the housing both by applying hydraulic pressure of the hydraulic chamber and by means of a mechanical actuator, wherein the sealing ring can be fitted in an annular groove formed in the housing, wherein the annular groove has a groove floor running parallel to the piston longitudinal axis as well as two groove walls adjacent to the groove floor, wherein—as viewed in the direction of the piston longitudinal axis—a first groove wall is directed away from the hydraulic chamber and a second groove wall is directed towards the hydraulic chamber, wherein the first groove wall merges via a rounded transition area with a varying distance to the piston longitudinal axis into the groove floor and the second groove wall merges via a bevelled transition area with a varying distance to the piston longitudinal axis into the groove floor, wherein the transition area has a profile that is substantially in the shape of a circular arc as viewed in a section containing the axis, and wherein the radius of the profile in the shape of the circular arc is in the range between 0.5 and 2 mm.

* * * * *